United States Patent [19]

James

[11] 4,150,769
[45] Apr. 24, 1979

[54] APPARATUS FOR METERING, MIXING AND DISPENSING FLUIDS

[75] Inventor: James R. James, Livonia, Mich.

[73] Assignee: Accuratio Systems, Inc., Novi, Mich.

[21] Appl. No.: 832,159

[22] Filed: Sep. 12, 1977

Related U.S. Application Data

[63] Continuation of Ser. No. 656,634, Feb. 9, 1976, abandoned.

[51] Int. Cl.² .............................................. G01F 11/02
[52] U.S. Cl. ................................... 222/137; 222/145;
222/318; 222/333; 222/334; 74/459
[58] Field of Search .............. 222/135, 137, 333, 334,
222/389, 390, 145, 318; 74/459

[56] References Cited

U.S. PATENT DOCUMENTS

| | | | |
|---|---|---|---|
| 992,897 | 5/1911 | Nichols et al. | 74/459 |
| 2,501,004 | 3/1950 | Reese | 222/263 X |
| 2,654,505 | 10/1953 | Fuhrman | 222/135 X |
| 3,390,815 | 7/1968 | Kavan et al. | 222/137 |
| 3,419,051 | 12/1968 | Gustafson et al. | 222/390 X |

FOREIGN PATENT DOCUMENTS

| | | | |
|---|---|---|---|
| 1222825 | 8/1966 | Fed. Rep. of Germany | 222/389 |
| 1454898 | 2/1969 | Fed. Rep. of Germany | 222/137 |

*Primary Examiner*—Robert J. Spar
*Assistant Examiner*—Frederick R. Handren
*Attorney, Agent, or Firm*—Barnes, Kisselle, Raisch & Choate

[57] ABSTRACT

Fluids to be mixed and dispensed are metered out of hydraulic cylinders by movement of pistons therein. The rate of movement is controlled by movement of a recirculating ball nut connected to each piston rod, movement of the nut, in turn, being controlled by the rate of rotation of its ball screw. Each screw carries a gear, and the gears have a common drive so that the ratio of the diameter of the gears accurately controls the volumetric metering ratio of the cylinders. In one form, an inert fluid under pressure acting on the reverse sides of the pistons assists the force of the ball nut drive. In another form, two cylinders work as a pair on each fluid, inert fluid under high pressure acting on the reverse sides of the pistons of each pair to meter, mix and dispense the fluids at about two thousand to two thousand five hundred pounds per square inch.

17 Claims, 9 Drawing Figures

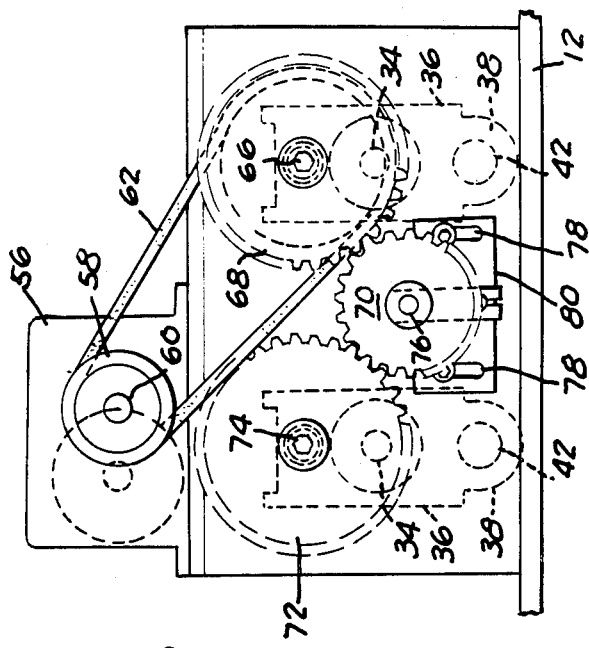
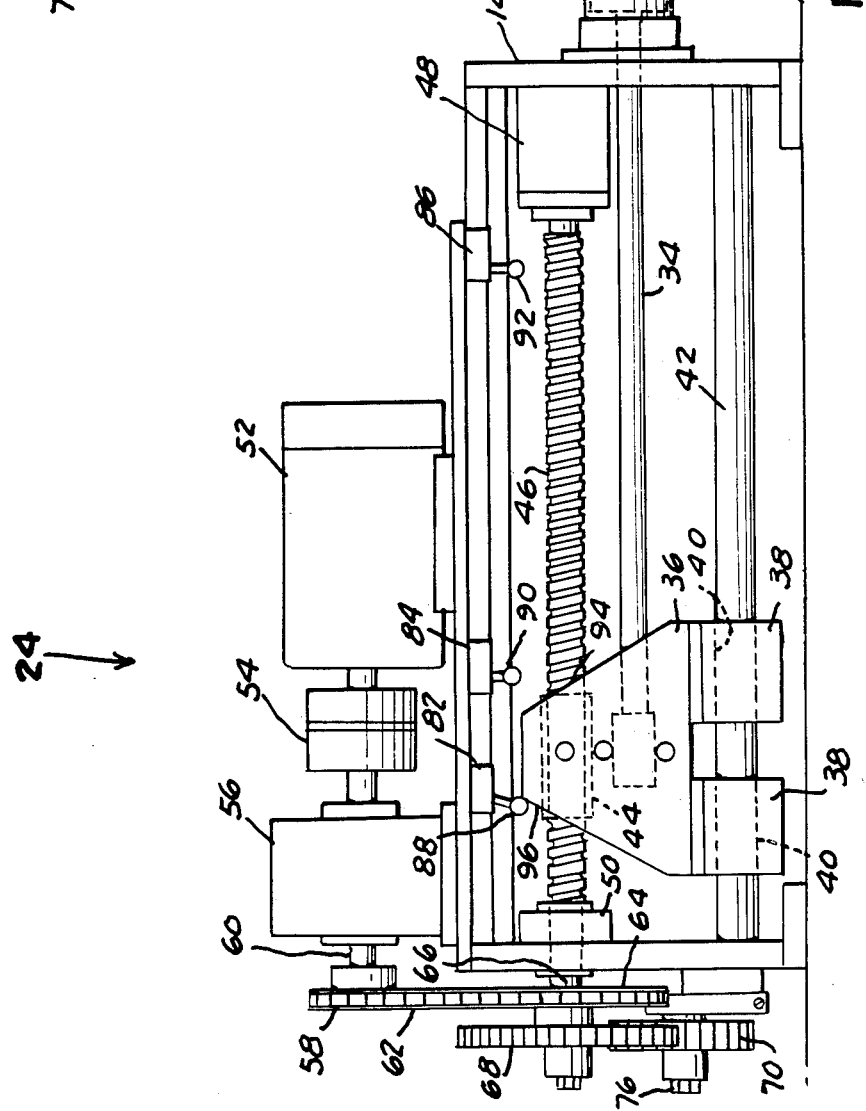
FIG. 3
FIG. 2

APPARATUS FOR METERING, MIXING AND DISPENSING FLUIDS

This is a continuation of application Ser. No. 656,634, filed Feb. 9, 1976, now abandoned.

This invention relates generally to apparatus which meters, mixes and dispenses a plurality of fluids usually of the type which react with each other. More particularly, the invention relates to that portion of the apparatus which meters the fluids.

In conventional apparatus of this type, each fluid is maintained under pressure by a conventional gear pump, and the metering is accomplished by opening a metering valve for a predetermined period of time which is coordinated with the pressure of the fluid and its viscosity to deliver an accurately determined volume of the fluid to a mixing head. The fluids are mixed by the head. In most applications it is necessary to control the volumetric accuracy of the metered fluids to within one percent.

Gear pumps characteristically have a volumetric efficiency which is very sensitive to the viscosity of the fluid being pumped. The viscosity of a fluid depends not only on its inherit characteristics but also on such factors as temperature. In order to attain the required one percent metering accuracy, the temperature of the fluid in a conventional machine must be accurately controlled. Even with such controls, however, it is difficult to keep a gear pump and the related equipment properly adjusted to attain metering with the required accuracy. One factor contributing to this difficulty is that the pump itself tends to heat the fluid, thereby changing its viscosity and the efficiency of the pump. Another shortcoming of a gear pump is that in a machine of the type under consideration a given pump can only be used with fluids having a limited range of viscosities. For example, to pump fluids ranging in viscosity from one-half centipoise to forty thousand centipoise as many as five different pumps would be required.

The object of the present invention is to provide a machine of the type under consideration having a relatively simple, inexpensive metering structure which is improved to meter fluids within the required range of accuracy even though the fluids may range in viscosity from one-half centipoise to forty thousand centipoise.

One form of the invention is illustrated in the accompanying drawings in which:

FIG. 2 is a side elevational view of the metering apparatus per se.

FIG. 3 is a generally and elevational view of the apparatus shown in FIG. 2.

Figure 1:
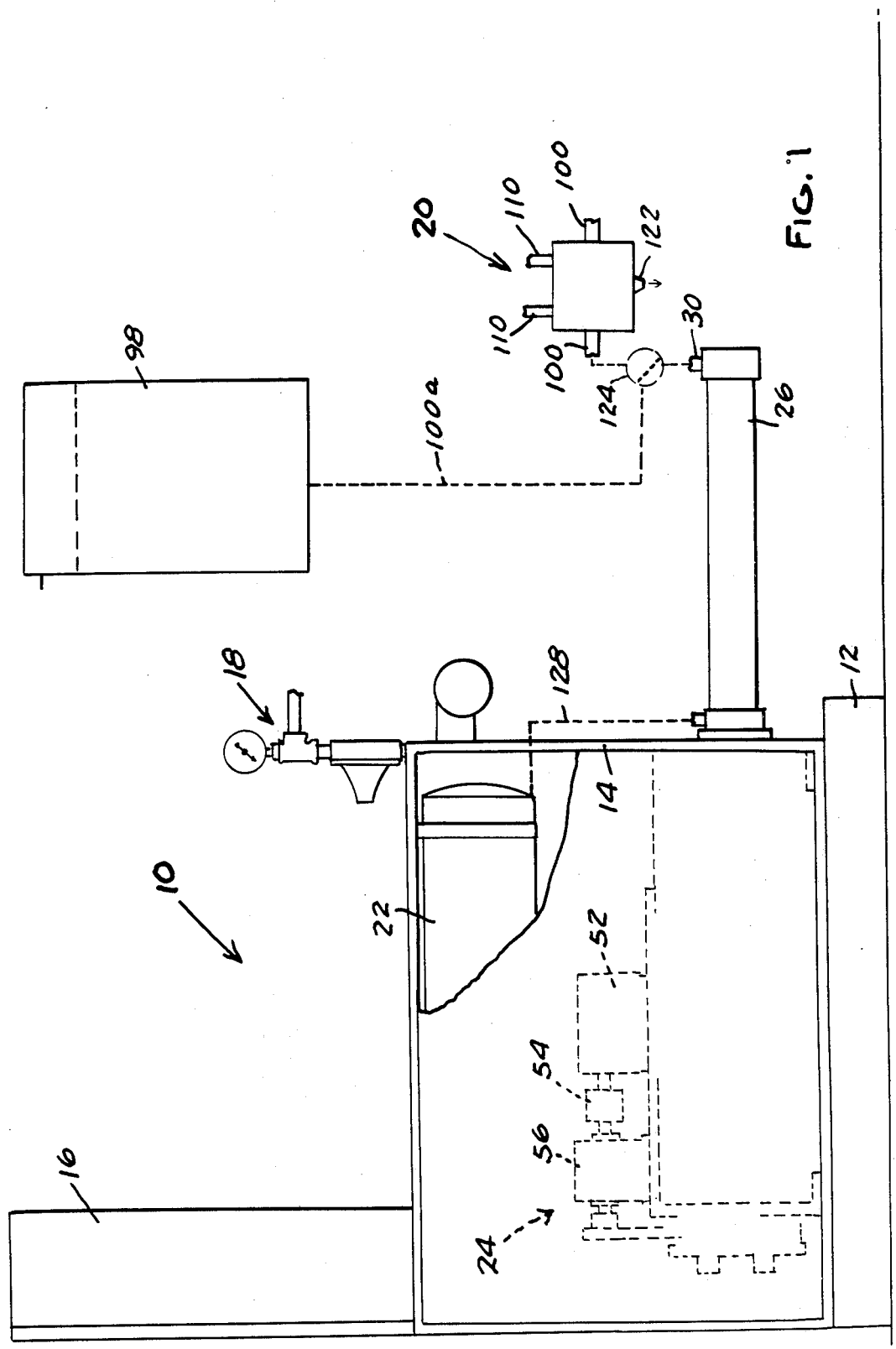
FIG. 1 is a generally side elevational view of a machine embodying the present invention.

Shown in the drawings is a machine 10 according to the invention. The machine has a base 12 and a frame 14 thereupon which supports equipment such as a control panel 16, hydraulic duct work 18, a mixing head 20 and tanks 22 for pressurized inert fluid whose purpose is described below. Mounted on base 12 is a metering apparatus 24 in accordance with the invention.

Apparatus 24 includes for each of the fluids to be metered and mixed a hydraulic cylinder 26 mounted on frame 14 and having a piston 28 therein. Fluid is introduced into cylinder 26 and dispensed therefrom through a hydraulic line 30. Piston 28 has a piston rod 34 which projects into frame 14 and is connected to a carriage 36 having depending lugs 38 with openings 40 slidably engaged around a rod 42 mounted on frame 14 parallel to piston rod 34. Mounted on carriage 36 is a recirculating ball-type nut 44 engaged around a ball screw 46 extending parallel to piston rod 34 and being journalled on frame 14, as at 48 and 50.

One of the screws 46 is driven by a motor 52 on frame 14 through a clutch 54, a transmission 56, a gear 58 on the output shaft 60 of the transmission, and a chain 62 entrained around gear 58 and a gear 64 on a shaft 66 which is an extension of screw 46 and which projects to the exterior of frame 14. In the apparatus illustrated, a second ball screw 46 is driven by a gear 68 on shaft 66 outboard of gear 64 meshed with an idler gear 70 on frame 14 and, in turn, meshed with a gear 72 mounted on the shaft extension 74 of the second ball screw 46. Gears 68, 70, 72 have a conventional quick change mounting on their respective supporting shafts. The shaft 76 for idler gear 70 can be vertically adjustably positioned as indicated by the vertical slots 78 in its mount 80 (FIG. 3) to accommodate gears 68 and 72 of different diameters. A series of three limit switches 82, 84 and 86 are mounted on frame 14 along the line of travel of one of the carriages 36. The limit switches, respectively, have toggles 88, 90 and 92 positioned for engagement by a forward face 94 and/or a rearward face 96 of carriage 36.

Shown in FIGS. 4–7 is a typical basic hydraulic circuit utilized with each metering apparatus 24. Each circuit includes a source of the fluid to be metered, mixed and dispensed such as a tank 98. A hydraulic line 100 connects tank 98 to dispensing head 20. In line 100, progressing from the tank to the metering head, is a pump 102, a pressure gauge 104, a solenoid operated valve 106 and another pressure gauge 108. Hydraulic line 30 connecting into cylinder 26 also connects into line 100 between valve 106 and metering head 20. Another hydraulic line 110 returns from head 20 to tank 98, and this line contains a pressure balancing needle valve 112. A bypass hydraulic line 114 connects into line 110 and into line 100 between pump 102 and valve 106. Bypass line 114 contains a pressure relief valve 116. As is conventional, head 20 contains a valve 118 for each of the fluids to be mixed and dispensed. Each valve 118 is operable selectively to connect line 100 with line 110 and to connect line 100 with a passageway 120 leading to a dispensing orifice 122. While not shown, a conventional head 20 also includes a mechanical mixing device downstream of orifice 122.

Figure 4:
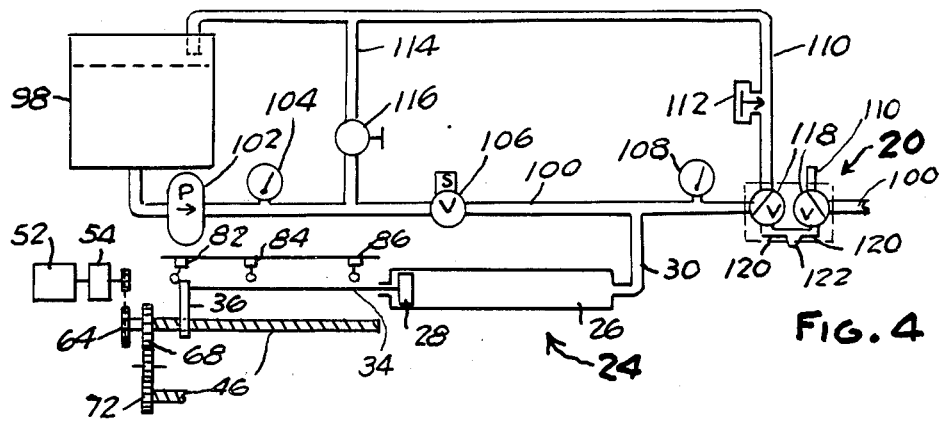
FIGS. 4–7 are diagrammatic views illustrating successive steps in a cycle of operation of the machine.

In use, it will be assumed that the apparatus is initially in its rest position illustrated in FIG. 4. In each apparatus 24, pump 102 is in operation, valve 116 is closed, valve 106 is open, and valve 118 interconnects lines 100, 110 so that the fluid in tank 98 is being continually recirculated through line 100, past head 20 and back to the tank through line 110. Cylinder 26 is filled with a fluid to be fed to head 20. Motor 52 is running, but clutch 54 is disengaged. To initiate a metering, mixing and dispensing cycle, a suitable control is actuated for engaging clutch 54, causing motor 52 through the power train described above to begin rotating gears 68, 72 which, in turn, causes ball screws 46 to begin rotation. In each metering apparatus 24, ball nut 44, carriage 36, piston rod 34 and piston 28 begin to advance to the right as the drawings are viewed, causing the fluid in cylinder 26 to begin to dispense or meter through hydraulic lines 30,100 toward head 20.

Simultaneously with engagement of clutch 54, solenoid valve 106 is closed which prevents fluid dispensed from cylinder 26 from flowing away from head 20 rather than toward it. When valve 106 closes, pressure builds between pump 102 and pressure relief valve 116, causing this valve to open with the result that the fluid being moved by pump 102 now recirculates back to tank 98 through lines 100,114 and 110. During movement of carriage 36 to the right from limit switch 82 toward limit switch 84 (FIG. 5), the position of valves 118 remains unchanged and the pressure of the fluid in cylinder 26, lines 30,100, head 20 and that portion of line 110 upstream of pressure balance valve 112 builds up to the pressure at which mixing and dispensing from head 20 will occur. This portion of the cycle is termed the pressure balancing phase and usually takes from about one to about three seconds.

Figure 5:
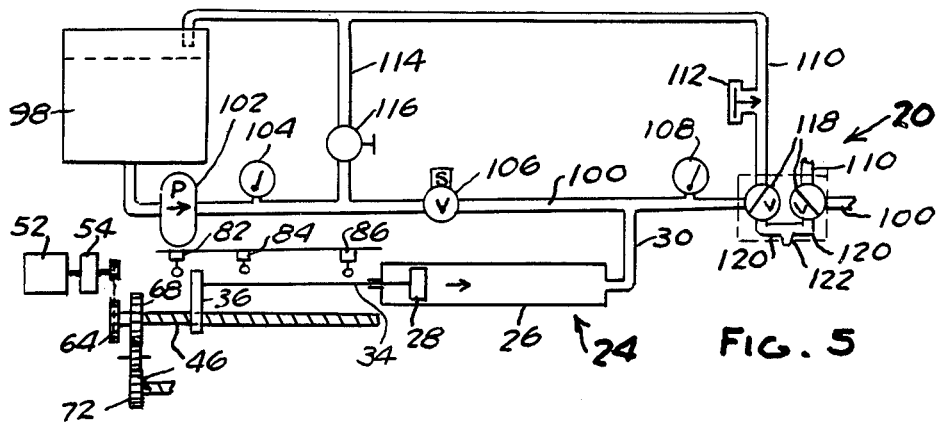
Figure 6:
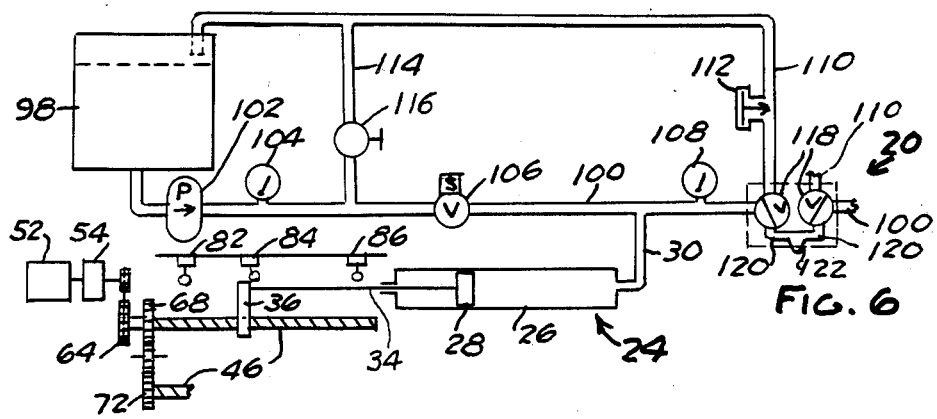

When carriage 36 engages limit switch 84, suitable controls are actuated to shift valves 118 from the position of FIGS. 4 and 5 to the position of FIG. 6 in which the fluids being forced from cylinders 26 are admitted from lines 100 into passageways 120 where they are mixed and then dispensed through outlet 122. Simultaneously with the shifting of valves 118, a suitable timer (not shown) is actuated, and metering of the fluids out of cylinders 26, mixing of the fluids in head 20 and dispensing the mixed fluids continues until the timer times out. This usually occurs before carriage 36 reaches limit switch 86, as is illustrated in solid lines in FIG. 7.

Figure 7:
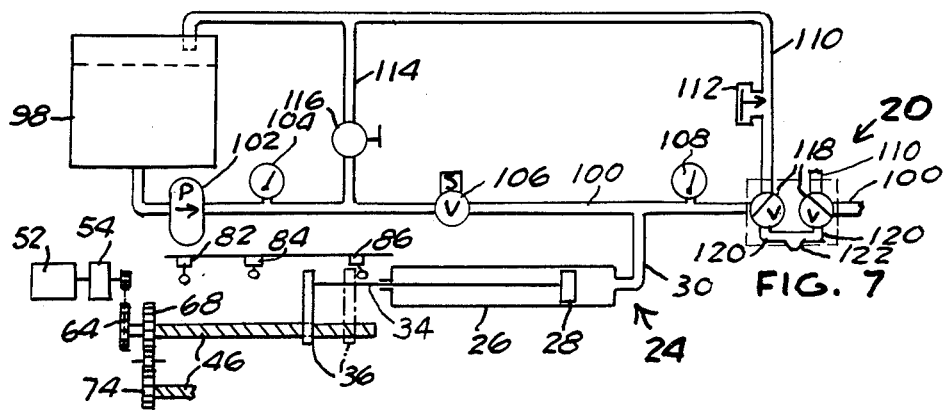

When the timer times out, the controls are actuated simultaneously to return valves 118 to the position of FIGS. 4, 5 and 7, to open valve 106 and to reverse the direction of motor 52. The direction of rotation of ball screws 46 is reversed, thereby drawing each nut 44, carriage 36, piston rod 34 and piston 28 to the left as the drawings are viewed. Pressure is relieved in line 100, and valve 116 closes. The fluid in the system again begins to circulate from tank 98, through lines 100, 110 back to the tank. As pistons move leftward, each cylinder 26 is refilled with fluid from its respective tank 98 via hydraulic lines 100,30. The refill cycle continues until carriage 36 trips limit switch 82 whereupon the controls are actuated for disengaging clutch 54, and the cycle is complete. Apparatus 24 is now in condition for a subsequent cycle of operation.

In numerous applications a temperature conditioner is provided for maintaining the fluid in each apparatus 24 at a uniform temperature for promoting uniform reaction rates of the mixed fluids to insure dispensing a uniform quality material from orifice 122 in successive cycles. When machine 10 is not actually in use but may be used momentarily, it is frequently allowed to cycle continuously without opening dispensing valves 118 to allow the fluids to circulate through the temperature conditioners for maintaining their proper temperature level. In this mode of operation, the timer referred to above is out of the circuitry, and carriages 36 merely move back and forth between their rest position of FIG. 1 and a forward position illustrated in dotted lines in FIG. 7 wherein the one carriage trips limit switch 86 which performs the reversal function of the timer. In this mode of operation, motor 52, clutch 54 and valves 106,116 function in the manner described during each cycle.

From the foregoing description it will be seen that in each metering, mixing and dispensing cycle of operation each piston 28 moves forward at a rate which is determined by the rate of rotation of its respective ball screw 46, this rate being determined by the diameter of the drive gear 68,72 mounted thereon. Thus, the ratio of the diameters of the two gears establishes with pinpoint accuracy the rate of movement of pistons 28 and the ratio at which fluids are metered or dispensed from cylinders 26 to head 20. The accuracy of metering is not influenced by the viscosity of the fluids in cylinders 26. In a typical apparatus 24 according to the present invention, fluids in the range from one-half centipoise to forty thousand centipoise can be metered with a volumetric accuracy of one-fourth of one percent. Since pump 102 is used only at relatively low pressures to circulate the fluid through hydraulic lines 100,110 and to charge a cylinder 26 during the refill cycle, a single conventional gear pump is adequate for use with fluids throughout this viscosity range. To change the ratio of the fluids metered from cylinders 26 it is only necessary to change one or both gears 68,72 which may require a change of idler gear 70 or an adjustment of its position to mesh properly with the newly installed gear or gears on ball screws 46.

The various controls for motor 52, clutch 54 and valves 106,118 are conventional. As will be obvious to one skilled in the art, the combination of motor 52, clutch 54 and transmission 56 could be modified in any one of several ways to obtain a fast rate of return of carriages 36 and pistons 28 after the dispensing step in order to increase the production rate of apparatus 24.

Figure 8:
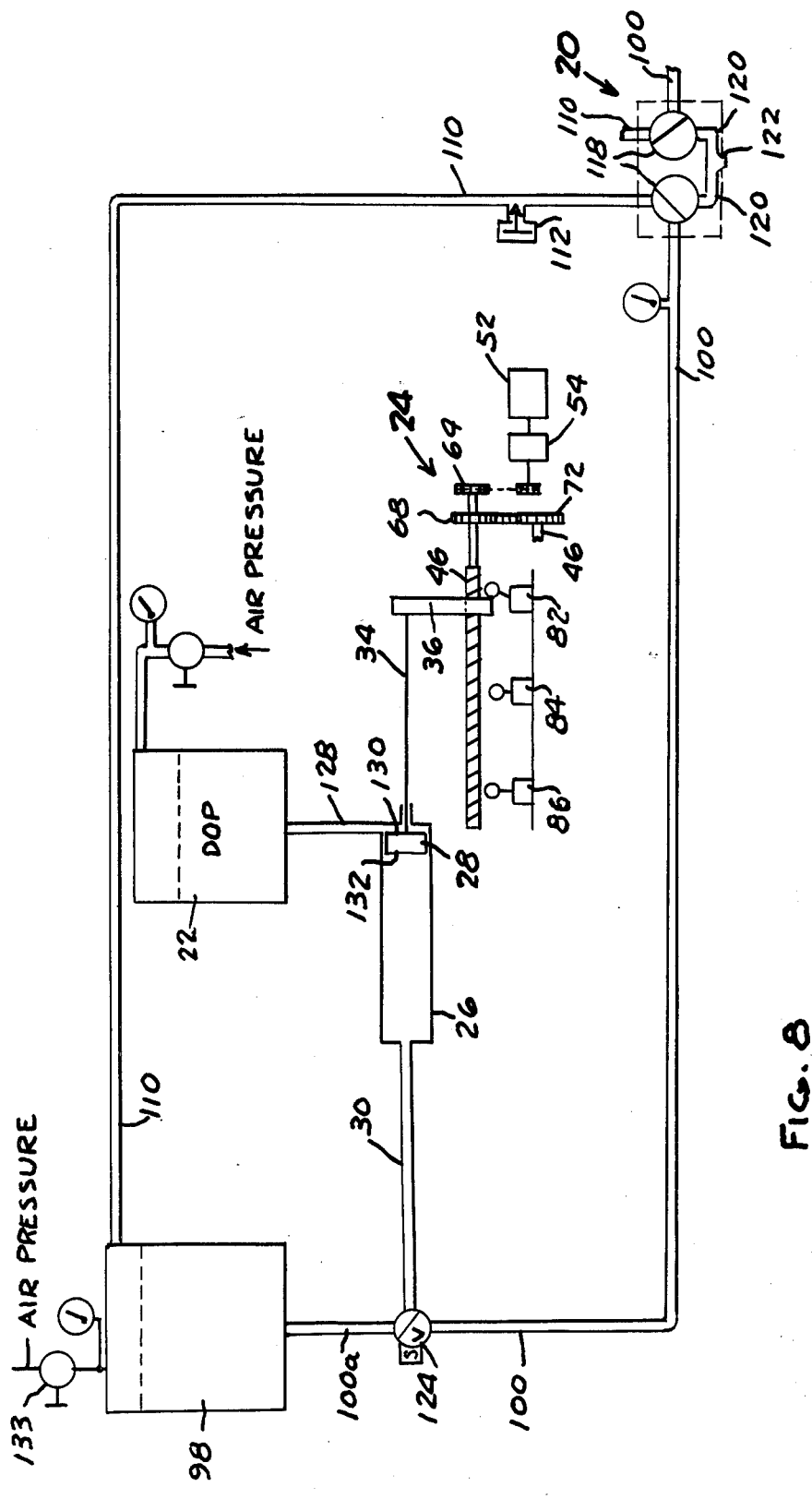
FIG. 8 is a diagrammatic view illustrating a modified form of the invention.

The modified form of the invention shown in FIG. 8 is generally similar to that described above except for a modification in the hydraulic circuitry. In the FIG. 8 form tank 98 is pressurized, and pump 102 is eliminated. Hydraulic lines 30,100 are interconnected at a three-way solenoid operated valve 124. Each cylinder 26 is provided with a tank 22 (FIGS. 1 and 8) which contains under pressure a fluid which is inert with respect to the fluid contained in tank 98. By way of example, when a polyurethane material is contained in tank 98, dioctyl phthalate (DOP) is a suitable inert material. Tanks 22,98 are usually pressurized by dry air or nitrogen. A hydraulic line 128 connects into tank 22 and into cylinder 26 on the side 130 of piston 28 opposite from the side 132 which is exposed to the fluid in line 30.

The method of operation of this form of the invention is similar to that first described except that in the rest condition of apparatus 24 illustrated in FIG. 8 valve 124 connects line 30 with tank 98 through a portion 100a of line 100 extending between the valve and tank. Simultaneously with actuation of motor 52, valve 124 is shifted to a position interconnecting line 30 with line 100. The forward or dispensing movement of piston 28 is assisted by the pressure of the inert fluid from tank 22 on face 130 of piston 28. When motor 52 reverses at the end of the dispensing step, valve 124 is simultaneously returned to the position of FIG. 8. The pressure of the fluid in tank 98 assists in the return of piston 28 against the pressure of the fluid contained in tank 22. The pressures in tanks 22,98 may vary from about five pounds per square inch for low viscosity fluids to about one hundred pounds per square inch for high viscosity fluids. The relative pressures in the tanks are adjusted by pressure regulators 133 to obtain as nearly as possible equal forces on the opposite sides 130,132 of piston 28.

Figure 9:
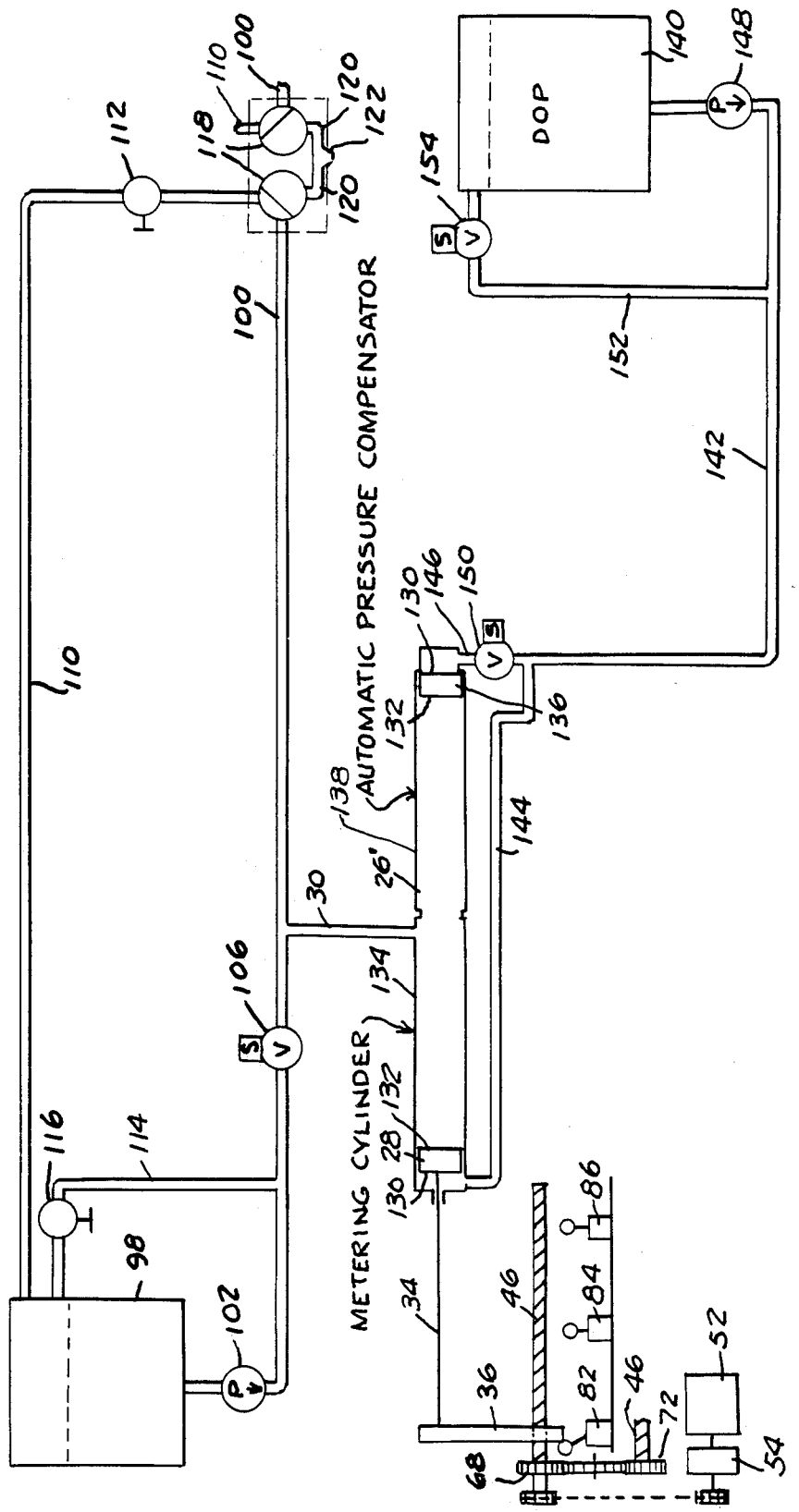
FIG. 9 is a diagrammatic view illustrating another modified form of the invention.

The modified form of invention illustrated in FIG. 9 is similar to that first described above except that the hydraulic circuitry is adapted for metering, mixing and dispensing of the fluids under high pressure. To this end each metering cylinder 26' is double ended with piston 28 in one end 134 and a free floating piston 136 in its other end 138. A quantity of inert fluid is contained in a tank 140 from which fluid is furnished to the opposite ends of cylinder 26' through a hydraulic line 142 which has branches 144,146 connected, respectively, into ends 134,138 of cylinder 26'. A pump 148 is provided in line 142 upstream of its branched portion and a solenoid operated valve 150 is provided in branch line 146. A bypass 152 is connected into line 142, the bypass being provided with a solenoid operated valve 154 and returning to tank 140. Pump 148 is conventional and is of the type which builds pressure responsive to the resistance to fluid flow therethrough.

Operation of this form of the invention is generally similar to that first described above with the exception of operation of the high pressure system. When the apparatus is in the rest position of FIGS. 4 and 9, valves 106, 150, 154 are open, cylinder 26 is filled with fluid from tank 98 and the output from pump 148 is recirculated under low pressure back to tank 140 through valve 154. When piston 28 begins to move forward in the pressure balancing phase of the dispensing cycle, valve 106 closes, as described above, and simultaneously valve 154 also closes.

Pump 148 quickly builds up the pressure in line 142 to the range of about two thousand PSI to about two thousand five hundred PSI. This pressure is transmitted through branches 144,146 into ends 134,138 of cylinder 26', acts on faces 130 of pistons 28,136 opposite from the faces 132 thereof exposed to the fluid from tank 98, and is transmitted to the fluid in cylinder 26'. When the timed mixing and dispensing phase begins, valve 150 is closed to prevent movement of piston 136 which would interfere with accurate metering of the fluid out of cylinder 26' toward head 20.

During the mixing and dispensing phase, piston 28 accurately meters a quantity out of cylinder 26' toward head 20 as in the previously described forms of the invention. The fluids entering head 20 are forced at high pressure through small orifices in small streams which impinge directly on each other, the mixing being effected by this impingement. This has the advantage that the mechanical mixing device in most conventional heads 20 can be eliminated. Upon termination of the timed mixing and dispensing phase, valves 150,154 open to relieve the pressure on piston faces 130 and valve 106 simultaneously opens to permit the apparatus to return to its rest position, cylinder 26' being refilled in the process. Pump 148 resumes circulating the inert fluid through line 152, valve 154 and tank 140 at low pressure. It is contemplated that the apparatus of FIG. 9 can employ pressures of up to about five thousand PSI in the high pressure part of the system.

In the foregoing description ball screws 46 have been described as being driven by a motor through gearing in order to effect movement of pistons 28 at desired relative rates. However, it is within the scope of the invention to utilize the interaction between a plurality of recirculating ball nuts and screws in general to control the relative rates of movement of pistons or cylinders in order to attain dispensing from the cylinders of fluids at predetermined ratios with high accuracy. It will also be understood that the invention is not limited to use in connection with a mixing and dispensing head 20 but can be used in any situation where accurate metering of fluids in desired ratios is required. While the present invention is illustrated with respect to a machine 10 having two metering devices 24, a machine 10 can be readily adapted to use as many as six devices 24 in concert without becoming unwieldy or excessively bulky.

I claim:

1. Apparatus fo dispensing a plurality of fluids in a predetermined volumetric ratio which comprises,
   a fluid pressure cylinder and piston for each of the fluids to be dispensed,
   means including valving by which each said cylinder is adapted to receive a said fluid and to dispense the same responsive respectively to relative movement of said cylinder and piston in one direction and another direction,
   means operable to cause said relative movement of said cylinders and pistons for said fluids respectively at rates which are in a ratio coordinated with said volumetric ratio so that fluids are dispensed from said cylinder in said volumetric ratio,
   in addition to said operable means a source of another fluid under pressure, said other fluid being inert with respect to the first mentioned fluids,
   and means operable to introduce said other fluid into each said cylinder on the side of said piston to promote said relative movement in said other direction.

2. The structure defined in claim 1 wherein said cylinders and pistons have substantially the same effective diameters and said volumetric and rate ratios are substantially the same.

3. Apparatus for dispensing a plurality of fluids in a predetermined volumetric ratio which comprises,
   a fluid pressure cylinder and piston for each of the fluids to be dispensed,
   means including valving by which each said cylinder is adapted to receive a said fluid and to dispense the same responsive, respectively, to relative movement of said cylinder and piston in one direction and another direction,
   means for applying motive force to effect said relative movement,
   a recirculating ball nut and screw assembly for each said cylinder and piston,
   said assemblies being interconnected so that when they are driven said nut and screw of each assembly move relative to each other and the rates of relative movement are in a ratio coordinated with said volumetric ratio,
   each said assembly being connected so that its said rate of movement controls the rate of relative movement of its respective cylinder and piston,
   a source of another fluid under pressure, said other fluid being inert with respect to the first-mentioned fluids, and means operable to introduce said other fluid into each said cylinder on the side of said piston to promote said relative movement in said other direction.

4. The structure defined in claim 3 wherein the first-mentioned fluids and said other fluid are liquid.

5. The structure defined in claim 10 wherein said apparatus has a fluid mixing and dispensing head to which each said cylinder and piston deliver a first said fluid under pressure.

6. The structure defined in claim 5 and including, in addition, a source of each first-mentioned fluid under pressure, said valving being operable to connect each said cylinder on the side of said piston opposite the first-mentioned side selectively with a latter said source and with said head.

7. The structure defined in claim 4 wherein said apparatus has a fluid mixing and dispensing head to which each said cylinder and piston deliver a first said fluid under pressure,
  said apparatus also including for each said cylinder and piston another cylinder and piston also adapted to receive a first said fluid,
  said operable means being operable to introduce said other fluid into each said other cylinder on the side of its piston opposite from that exposed to said first fluid substantially simultaneously with introduction of said other fluid into the respective first-mentioned cylinder.

8. The structure defined in claim 7 and including means operable to elevate the pressure of said other fluid in each first-mentioned cylinder and other cylinder to at least about two thousand pounds per square inch.

9. The structure defined in claim 8 wherein said pressure is in the range of about two thousand pounds per square inch to about five thousand pounds per square inch.

10. The structure defined in claim 8 wherein said pressure is in the range of about two thousand pounds per square inch to about two thousand five hundred pounds per square inch.

11. The structure defined in claim 8 wherein each first-mentioned cylinder and its respective other cylinder are mounted substantially coaxially, the piston in the first-mentioned cylinder being movable away from and toward the piston in the other cylinder, respectively, in said one direction and said other direction.

12. The structure defined in claim 11 wherein the pistons in said other cylinders are movable solely under the influence of said fluids in said other cylinders.

13. Apparatus for dispensing a plurality of fluids in a predetermined volumetric ratio which comprises,
  a fluid pressure cylinder and piston for each of the fluids to be dispensed,
  means including valving by which each said cylinder is adapted to receive a said fluid and to dispense the same responsive, respectively, to relative movement of said cylinder and piston in one direction and another direction,
  means for applying motive force to effect said relative movement,
  a recirculating ball nut and screw assembly for each said cylinder and piston,
  said assemblies being interconnected so that when they are driven said nut and screw of each assembly more relative to each other and the rates of relative movement are in a ratio coordinated with said volumetric ratio,
  each said assembly being connected so that its said rate of movement controls the rate of relative movement of its respective cyliner and piston,
  said apparatus having a frame upon which said cylinders are mounted in stationary condition, each piston having a piston rod which extends to the exterior of its respective cylinder,
  each said screw being mounted in axially stationary condition on said frame, a gear mounted in driving relation on each said screw,
  a motor mounted on said frame, gearing on said frame driven by said motor and providing a common drive for said gears on said screws, said gears having relative diameters which determine the relative rate of rotation of said screws,
  each said nut being drivably connected to a carriage movable on said frame, the rate and direction of movement of each nut and its carriage being determined by the rate and direction of rotation of its screw and gear thereon,
  each said carriage being connected to a said piston rod and providing in part said means for applying motive force,
  a source of each said fluid under pressure, a fluid mixing and dispensing head to which each cylinder and piston deliver a said fluid under pressure,
  hydraulic circuitry which includes a line from said source to said head, a conduit connecting the interior of each cylinder into said line and valve means which in open and closed condition, respectively, establish and cut off hydraulic communication between said line and the interiors of said cylinders,
  and control circuitry operable to open and close said valve means, respectively, upon movement of said pistons in said one direction and said other direction,
  a tank for each cylinder, each tank containing another fluid under pressure, said other fluid being inert with respect to the first-mentioned fluids, and a hydraulic line connecting the interior of each tank with the interior of a said cyliner on the side of said piston opposite from that which is exposed to a first-mentioned fluid.

14. The structure defined in claim 13 wherein said head and said tanks are mounted on said frame.

15. The structure defined in claim 14 wherein said control circuitry is mounted on said frame.

16. Apparatus for dispensing a plurality of fluids in a predetermined volumetric ratio which comprises,
  a fluid pressure cylinder and piston for each of the fluids to be dispensed,
  means including valving by which each said cylinder is adapted to receive a said fluid and to dispense the same responsive, respectively, to relative movement of said cylinder and piston in one direction and another direction,
  means for applying motive force to effect said relative movement,
  a recirculating ball nut and screw assembly for each said cylinder and piston,
  said assemblies being interconnected so that when they are driven said nut and screw of each assembly more relative to each other and the rates of relative movement are in a ratio coordinated with said volumetric ratio,
  each said assembly being connected so that its said rate of movement controls the rate of relative movement of its respective cylinder and piston,
  a source of another fluid under pressure,
  said apparatus including for each said cylinder and piston another cylinder and piston adapted to receive said other fluid,
  means operable to introduce said other fluid into each said other cylinder,
  means operable to elevate the pressure of said other fluid in each said other cylinder to at least about 2000 lbs. per square inch, means effective to transmit the resulting force of said other fluid on each said other piston to the fluid in its respective first-mentioned cylinder.

17. Apparatus for dispensing a plurality of fluids in a predetermined volumetric ratio which comprises, a fluid pressure cylinder and piston for each of the fluids to be dispensed, means including valving by which each said cylinder is adapted to receive a said fluid and to dispense the same responsive respectively to relative movement of said cylinder and piston in one direction and another direction, means operable to cause said relative movement of said cylinders and pistons for said fluids respectively at rates which are in a ratio coordinated with said volumetric ratio so that fluids are disposed from said cylinders in said volumetric ratio, a source of another fluid under pressure, said other fluid being inert with respect to the first mentioned fluids, and means operable to introduce said other fluid into each said cylinder on the side of said piston to promote said relative movement in said other direction, means providing for each said cylinder and piston another cylinder and piston adapted to receive said other fluid, means operable to introduce said other fluid into each said other cylinder, means operable to elevate the pressure of said other fluid in each said other cylinder to at least about 2,000 lbs. per square inch, and means effective to transmit the resulting force of said other fluid on each said other piston to the fluid in its respective first-mentioned cylinder.

* * * * *